United States Patent
Yong

(10) Patent No.: US 7,907,789 B2
(45) Date of Patent: Mar. 15, 2011

(54) REDUCTION OF BLOCK EFFECTS IN SPATIALLY RE-SAMPLED IMAGE INFORMATION FOR BLOCK-BASED IMAGE CODING

(75) Inventor: Yan Yong, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1105 days.

(21) Appl. No.: 11/620,460

(22) Filed: Jan. 5, 2007

(65) Prior Publication Data

US 2008/0165863 A1 Jul. 10, 2008

(51) Int. Cl.
G06K 9/40 (2006.01)
H04B 1/66 (2006.01)
H04N 11/02 (2006.01)
H04N 11/04 (2006.01)
H04N 7/12 (2006.01)

(52) U.S. Cl. ............... 382/268; 382/254; 375/240.29
(58) Field of Classification Search .................. 382/268, 382/254; 375/240.29
See application file for complete search history.

(56) References Cited

U.S. PATENT DOCUMENTS

| | | | | |
|---|---|---|---|---|
| 6,707,467 | B1 * | 3/2004 | Suga | 345/698 |
| 6,873,655 | B2 | 3/2005 | Comer et al. | |
| 7,136,536 | B2 * | 11/2006 | Andersson et al. | 382/261 |
| 7,227,901 | B2 * | 6/2007 | Joch et al. | 375/240.29 |
| 2002/0067432 | A1 * | 6/2002 | Kondo et al. | 348/576 |
| 2005/0084012 | A1 | 4/2005 | Hsu et al. | |
| 2006/0038823 | A1 | 2/2006 | Arcas | |
| 2006/0126962 | A1 * | 6/2006 | Sun | 382/268 |
| 2006/0174236 | A1 | 8/2006 | Stein et al. | |
| 2007/0025448 | A1 * | 2/2007 | Cha et al. | 375/240.24 |
| 2007/0031065 | A1 * | 2/2007 | Sun | 382/299 |
| 2009/0141814 | A1 * | 6/2009 | Yin et al. | 375/240.29 |

FOREIGN PATENT DOCUMENTS

WO WO2006043772 4/2006

OTHER PUBLICATIONS

B. Ramamurthi and A. Gersho, "Nonlinear space variant postprocessing of block coded images". IEEE Trans. Acoust. Speech Signal Process. 34 (1986), pp. 1258-1268.*

Tourapis, A.M.; Boyce, J.; "Reduced resolution update mode extension to the H.264 standard", 2005. ICIP 2005. IEEE International Conference on Image Processing, vol. 2, pp. II-910-13.*

(Continued)

Primary Examiner — Samir A Ahmed
Assistant Examiner — Li Liu
(74) Attorney, Agent, or Firm — Gary R. Stanford

(57) ABSTRACT

A method of processing block-based image information including up sample filtering pixels located along boundaries of image blocks using a first filter strength and up sample filtering at least a portion of the pixels that are not located along boundaries of the image blocks using a second filter strength. The method may alternatively include up sample filtering pixels located along boundaries of image blocks and image sub-blocks using the first filter strength. An up sample filter system which includes a first up sample filter which filters pixels located along boundaries of the image blocks using a first filter strength and a second up sample filter which filters pixels that are not located along boundaries of the image blocks using a second filter strength.

9 Claims, 6 Drawing Sheets

OTHER PUBLICATIONS

Atzori, L. et al. "Adaptive Anisotropic Filtering (AAF) for real-time visual enhancement of MPEG-coded video sequences", Technical Report # DIT-02-0001, University of Trento (Italy), Jan. 2002.*

Marek Domanski, Lukasz Blaszak, Slawomir Mackowiak, AVC Video Coders with Spatial and Temporal Scalability, Poznan University of Technology, Institute of Electronics and Telecommunication, Poznan, Poland.

Giovanni Ramponi, Warped Distance for Space-Variant Linear Image Interpolation, IEEE Transactions on Image Processing, vol. 8, No. 5, May 1999.

Stephen K. Park, and Robert A Schowengerdt, Image Reconstruction by Parametric Cubic Convolution, Office of Arid Lands Studies and Electrical Engineering Department, University of Arizona, Received May 21, 1982.

* cited by examiner

REDUCTION OF BLOCK EFFECTS IN SPATIALLY RE-SAMPLED IMAGE INFORMATION FOR BLOCK-BASED IMAGE CODING

BACKGROUND OF THE INVENTION

1. Field of the Invention

The present invention relates in general to image processing, and more specifically to reduction of block effect in spatially re-sampled image information for block-based image coding including video coding.

2. Description of the Related Art

Up and down sampling, or more generally, re-sampling, of an image signal is a common function performed in image communication systems, including video systems, to facilitate scaling between different spatial resolutions. The Advanced Video Coding (AVC) standard, Part 10 of MPEG4 (Motion Picture Experts Group), otherwise known as H.264, includes advanced compression techniques that were developed to enable transmission of video signals at a wide range of bit rates or to enable improved video quality at a given transmission rate as compared to earlier video coding standards, such as H.263 and MPEG4-Part 2. The newer H.264 standard outperforms video compression techniques of earlier standards in order to support higher quality video at given bit rates and to enable internet-based video and wireless applications and the like. The standard defines the syntax of the encoded video bit stream along with a method of decoding the bit stream.

In many situations, it is desired to increase the resolution of a video stream for display, such as for zooming functions or for increasing resolution of the video information for display on a higher resolution display device. Up sampling is employed to increase the resolution of the video or image. During the up sampling process, zeroes or placeholder values are inserted into the video stream and each pixel is processed through a filter, such as a low pass filter (LPF) or the like. Since most of the compression schemes or coding standards are block-based, such as particular block sizes of pixels (e.g., 16×16, 8×8, 4×4) or particular coding standards (e.g., DCT or the like), when the decoded images or video frames are up sampled to increase the resolution, the block effects may appear or existing block effects may be exaggerated.

Scalable Video Coding (SVC) is an extension of the H.264 which addresses coding schemes for reliable delivery of video to diverse clients over heterogeneous networks using available system resources, particularly in scenarios where the downstream client capabilities, system resources, and network conditions are not known in advance, or dynamically changing over time. SVC provides multiple levels of scalability including temporal scalability, spatial scalability, complexity scalability and quality scalability. SVC achieves scalability by employing the concept of base and enhanced layers, in which an enhanced layer, or upper layer, is scalable from a lower layer, referred to as a base layer. The base layer should be the simplest form in quality, complexity, spatial resolution and temporal resolution. Complexity generally refers to the level of processing required during the coding process. Temporal scalability generally refers to the number of frames per second (fps) of the video stream, such as 7.5 fps, 15 fps, 30 fps, etc. Spatial scalability refers to the resolution of each frame, such as common interface format (CIF) with 352 by 288 pixels per frame, or quarter CIF (QCIF) with 176 by 144 pixels per frame, although other spatial resolutions are contemplated, such as 4CIF, QVGA, VGA, SVGA, D1, HDTV, etc. In the current development of spatial SVC of JVT, up and down sampling are used for inter-layer texture predictions. Existing re-sampling schemes lack performance in terms of coding efficiency and visual quality.

It is desired to improve the visual quality by reducing the block effects when up sampling image information for display or for inter-layer texture predictions.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed. Although the present disclosure is illustrated using video processing embodiments for processing video information, such as MPEG (Motion Picture Experts Group) type video information, the present disclosure applies in general to the processing of any image information or sequential image information, such as JPEG (Joint Photographic Experts Group) information, motion JPEG (MJPEG) information, JPEG2000 information, motion JPEG2000 (MJPEG2000)

information, etc. The term "image information" as used herein is intended to apply to any video or image or image sequence information.

Figure 1:
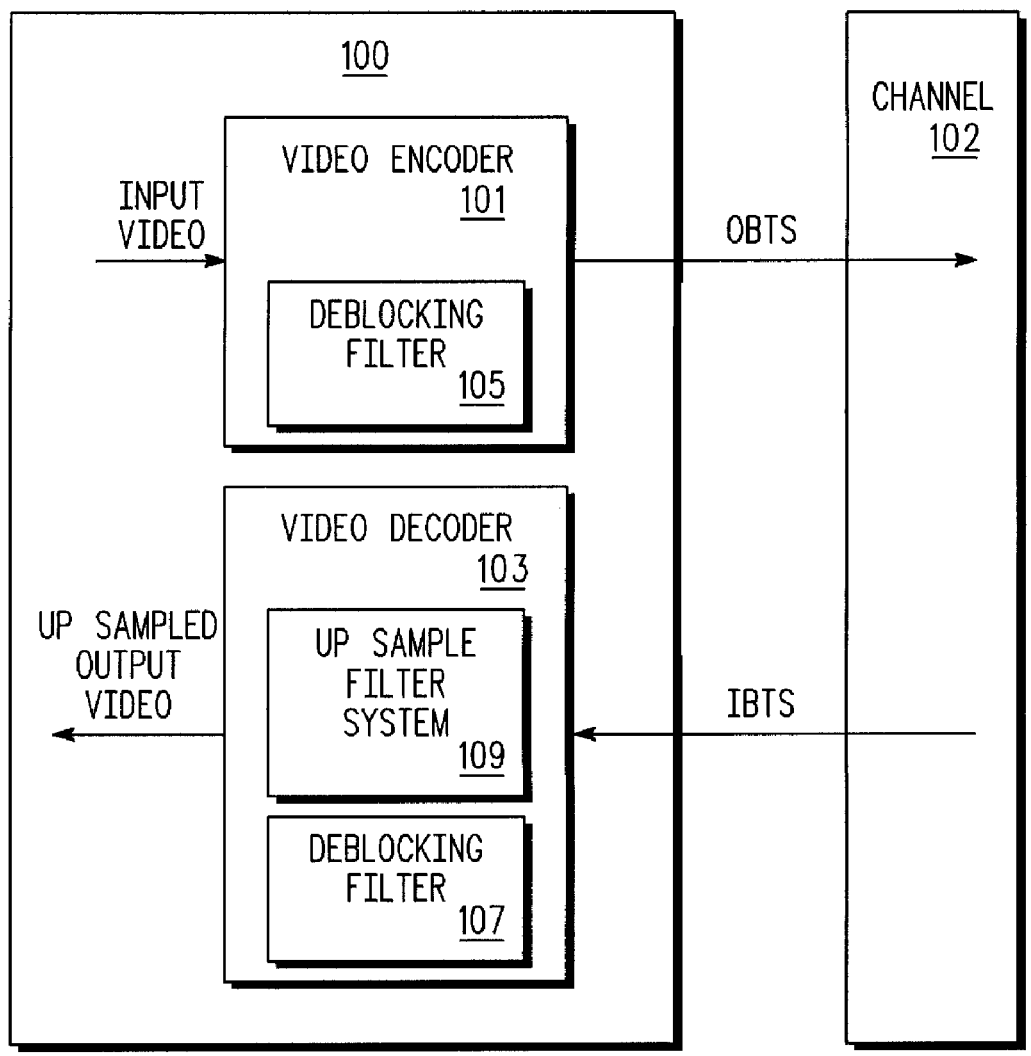
FIG. 1 is a simplified block diagram of a video system implemented according to an exemplary embodiment.

FIG. 1 is a simplified block diagram of a video system 100 implemented according to an exemplary embodiment. The video system 100 includes a video encoder 101 and a video decoder 103 communicating across a channel 102. The channel 102 may be any media or medium in which wired and wireless communications are contemplated. The video encoder 101 receives and encodes input video information and encapsulates the encoded video information into an output bitstream (OBTS). An input bitstream (IBTS) is provided via the channel 102 to the video decoder 103. In the illustrated embodiment, the video encoder 101 includes a deblocking filter 105 and the video decoder 103 also includes a deblocking filter 107. The deblocking filter is a formative part of H.264, MPEG4-Part 10, and the base layer of SVC, and is an informative part of earlier video coding standards such as H.263 and MPEG4-Part 2. The video system 100 is shown in generalized form and may be implemented according to any of the known standards (e.g., H.264, MPEG4-Part 10, SVC, H.263, MPEG4-Part 2, etc.). For the earlier video coding standards (e.g., H.263 and MPEG4-Part 2) in which the deblocking filter is only an informative part of the standard, deblock filtering may be performed as a "post" process or after the video information is decoded. The video decoder 103 is shown including an up sample filter system 109 and the video decoder 103 provides up sampled output video information.

Figure 2:
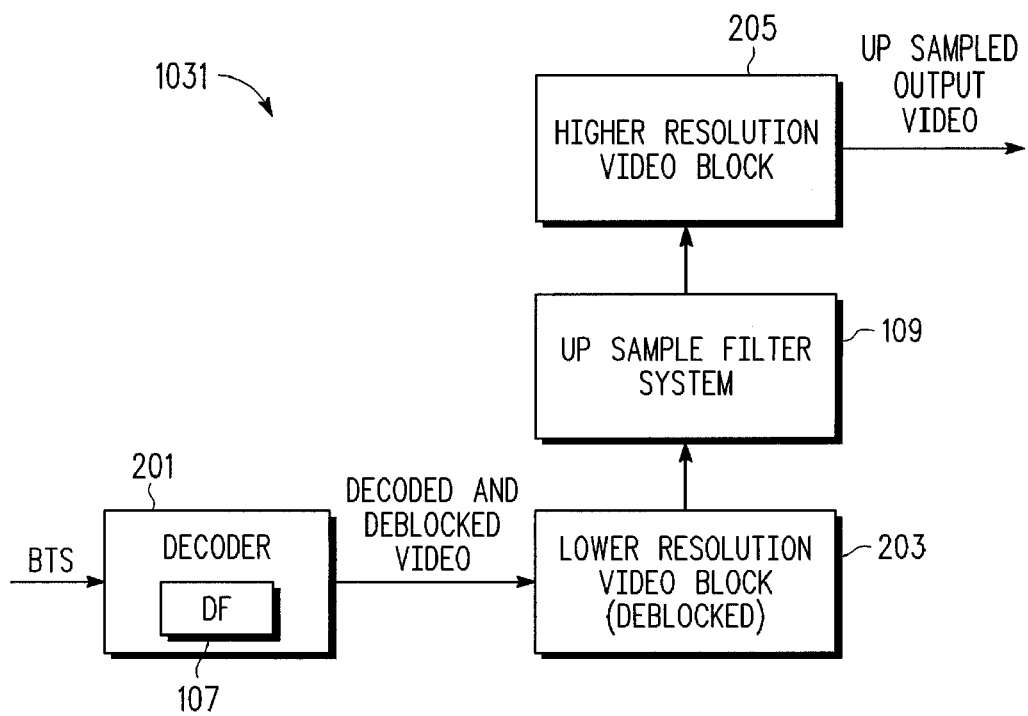
FIG. 2 is a block diagram of a video decoder illustrating one embodiment of the video decoder of FIG. 1.

FIG. 2 is a block diagram of a video decoder 1031 illustrating one embodiment of the video decoder 103. The input bitstream IBTS is provided to an input of a decoder 201 shown including the deblocking filter (DF) 107. In this case, the deblocking filter 107 may be incorporated within the decoding processing loop or as a post process to deblock filter decoded video information. The output of the decoder 201 is shown as decoded and deblocked video information. As known to those skilled in the art, each frame of video information is subdivided into one or more slices and encoded at the macroblock (MB) level, where each MB is a 16×16 block of pixels. The size of each slice is arbitrary and may range between a single MB up to all of the MBs in a frame. Each block of video information output from the decoder 201, shown represented as a lower resolution video block 203, is provided to the up sample filter system 109 to generate a corresponding higher resolution video block 205. Each block of video information is processed in this manner to generate up sampled output video information for higher resolution display.

Up and down sampling of video information or image information is a common problem in image or video communication and configuring resolution of video information for display. Since most of the compression schemes or coding standards are block based, such as particular block sizes of pixels (e.g., 16×16, 8×8, 4×4) or particular coding standards (e.g., DCT or the like), when the decoded images or video frames need to be re-sampled for providing the appropriate resolution for a display device, the block effects may appear or existing block effects may be exaggerated. In a non-SVC configuration, for example, the resolution may need to be increased for zooming or for a higher resolution display device. Up sampling is employed to increase the resolution of the video or image. In the current development of spatial SVC of JVT, down and up sampling are used for inter-layer texture predictions. The up sample filter system 109 is configured to reduce the block effects for the spatial re-sampling process for increasing resolution of the video information in non-SVC configurations. For SVC configurations, the up sample filter system 109 improves visual quality of predicted video information especially along block boundaries.

Figure 3:
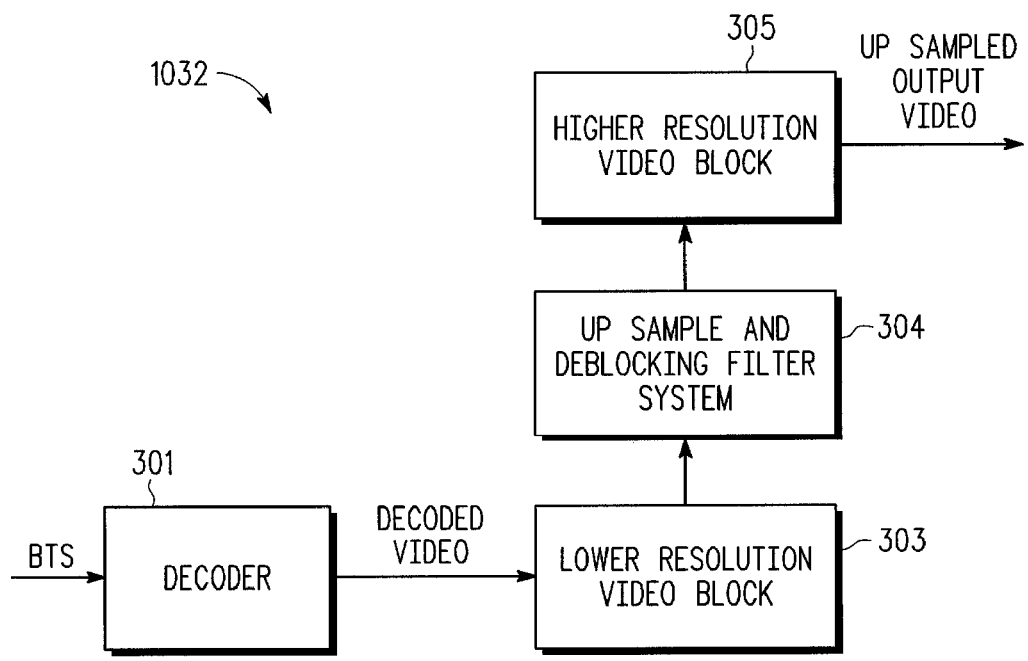
FIG. 3 is a block diagram of a video decoder illustrating another embodiment of the video decoder of FIG. 1.

FIG. 3 is a block diagram of a video decoder 1032 illustrating another embodiment of the video decoder 103. The input bitstream IBTS is provided to an input of a decoder 301 shown without the deblocking filter 107. The decoder 301 performs similar decoding functions of the decoder 201 except without deblock filtering. The decoded video is provided block by block, represented as a lower resolution video block 303, to an up sample and deblocking filter system 304, which provides corresponding higher resolution video blocks 305. The up sample and deblocking filter system 304 is similar to the up sample filter system 109 except that the filtering functions are further configured to perform deblock filtering. In this case, if deblocking is otherwise provided as a post process, the deblocking and re-sampling filter functions are combined into one filter system for filtering along and around block boundaries. The video decoder 1032 saves computing power and processing cycles by combining re-sampling and deblock filtering.

Figure 4:
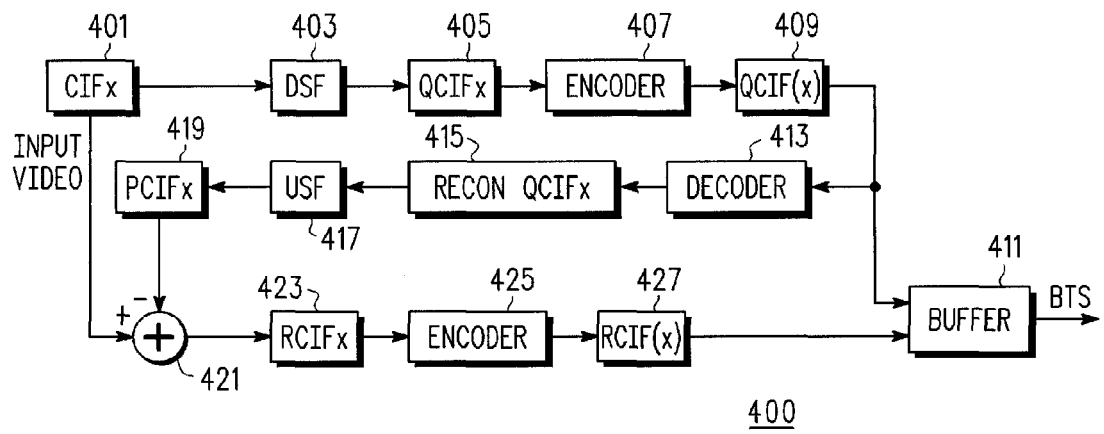
FIG. 4 is a block diagram of an SVC video encoder according to an exemplary embodiment of the video encoder of FIG. 1 configured as an SVC video encoder which illustrates the up and down sampling process.

FIG. 4 is a block diagram of an SVC video encoder 400 according to an exemplary embodiment of the video encoder 101 configured as an SVC video encoder which illustrates the up and down sampling process. The input video is illustrated as common interface format (CIF) blocks 401 (or CTFx blocks 401 in which "x" denotes the block number of the input video) having a frame resolution of 352 by 288 pixels per frame. The CTFx blocks 401 are provided to a down sampling filter (DSF) 403, which outputs corresponding quarter CIF blocks (QCIF), having frame resolution of 176 by 144 pixels per frame), shown as QCIFx blocks 405. The video encoder 400 supports spatial scalability referring to the resolution of each frame, such as CIF or QCIF as shown, although lower or higher frame resolutions are contemplated, such as 4CIF, QVGA, VGA, SVGA, D1, HDTV, etc. The QCIFx blocks 405 are each encoded by a video encoder 407, which outputs encoded QCIF blocks QCIF(x) 409. The encoded QCIF(x) blocks 409 are provided to one input of an output buffer 411, which incorporates or otherwise encapsulates the encoded QCIF(x) blocks 409 within the bitstream BTS. The encoded QCIF(x) blocks 409 are decoded within the video encoder 400 by a decoder 413, which outputs reconstructed QCIF blocks shown as RECON QCIFx blocks 415. The RECON QCIFx blocks 415 are each provided to the input of an up sampling filter (USF) system 417. The output of the USF system 417 provides predictive PCIFx blocks 419, which are each combined with corresponding ones of the CTFx blocks 401 by an adder 421 to provide residual RCIFx blocks 423. In particular, the adder 421 subtracts block PCIF1 from block CIF1 to provide block RCIF1, subtracts block PCIF2 from block CIF2 to provide block RCIF2, etc. The residual RCIFx blocks 423 are encoded by an encoder 425, which outputs encoded residual RCIF blocks shown as RCIF (x) blocks 427. The output buffer 411 also incorporates or otherwise encapsulates the encoded reference RCIF(x) blocks 425 into the bitsream BTS.

Since deblock filtering is a formative part of SVC, the encoders 407 and 425 typically incorporate deblocking filters in their respective coding loops representing the function of the deblocking filter 105. The encoders 407 and 425 may also be implemented as a single encoder and deblocking filter. The USF system 417 performs up sampling according to one embodiment for inter-layer prediction (e.g., from QCIF to CIF) and improves the visual quality of video coding especially along block boundaries.

Figure 5:
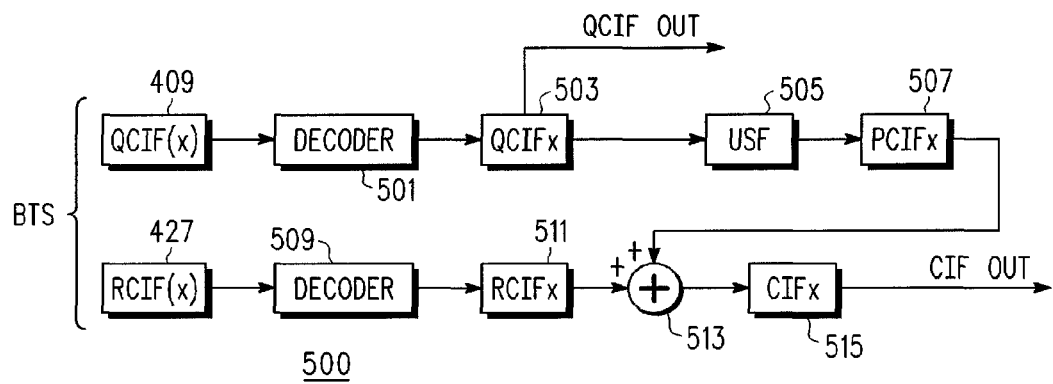
FIG. 5 is a figurative block diagram of an SVC video decoder according to an exemplary embodiment of the video decoder of FIG. 1 configured as an SVC video decoder illustrating the up sampling process.

FIG. 5 is a figurative block diagram of an SVC video decoder 500 according to an exemplary embodiment of the video decoder 103 configured as an SVC video decoder illustrating the up sampling process. The QCIFx blocks 409 are extracted from the bitstream BTS and provided to a decoder 501, which outputs corresponding decoded QCIFx blocks 503 as part of a QCIF video output for storage or display. The decoded QCIFx blocks 503 are provided to the input of an up sampling filter system 505. The output of the up sampling filter system 505 provides prediction PCIFx blocks 507, which are provided to one input of an adder 513. The residual RCIF(x) blocks 427 from the bitstream BTS are provided to a decoder 509, which outputs corresponding residual RCIFx blocks 511 provided to the other input of the adder 513. The adder 513 adds each of the predictive PCIFx blocks 507 with a corresponding one of the residual RCIFx blocks 511 and outputs corresponding CIFx video blocks 515 for storage or display. It is noted that the decoders 501 and 509 may be implemented as a single decoder as understood by those skilled in the art.

Since deblock filtering is a formative part of SVC, the decoders 501 and 509 incorporate deblocking filters in their respective decoding loops representing the function of the deblocking filter 107. The decoders 501 and 509 may also represent a single decoder with a single deblocking filter. The USF system 505, which represents the function of the up sample filter system 109, performs up sampling according to one embodiment for inter-layer prediction (e.g., from QCIF to CIF) and improves the visual quality of the CIF layer video especially along block boundaries. In another embodiment, an additional up sample filter system (not shown) may be provided to up sample the CIFx video blocks 515 to a higher resolution for display, which is a function similar to that performed by the up sample filter 109 or the up sample and deblocking filter 304 for increasing resolution (without combining predictive and residual information).

Figure 6:
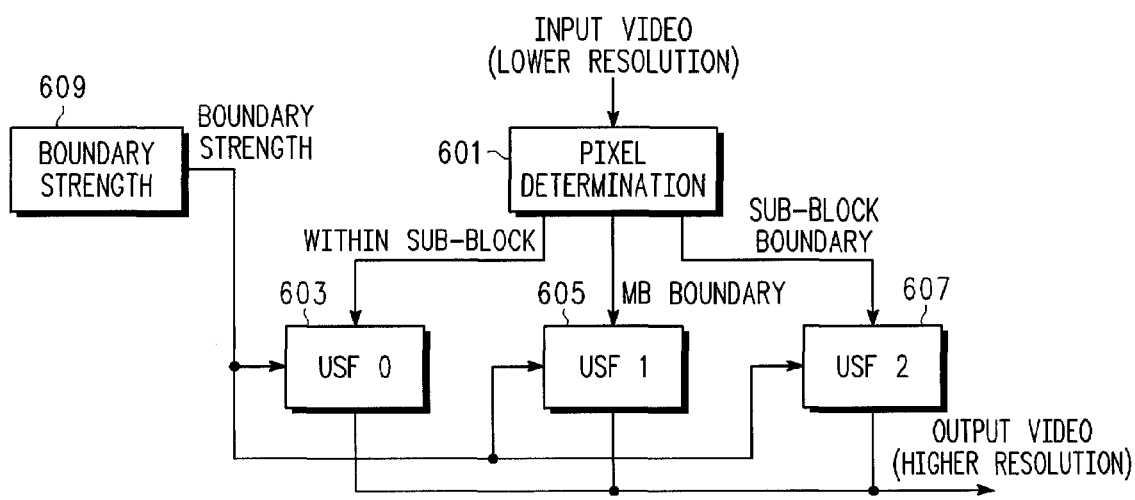
FIG. 6 is a block diagram of an up sample filter that may be used as any one of the up sample filters of FIGS. 1, 3, 4 and 5 for removing block effects and improving visual quality of up sampled video information according to an exemplary embodiment.

FIG. 6 is a block diagram of an up sample filter system 600 that may be used to implement any one or more of the up sample filter systems 109, 417, and 505 and the up sample and deblocking filter system 304 for removing block effects and improving visual quality of up sampled video information according to an exemplary embodiment. Each pixel of each block of the lower resolution input video is provided to a pixel location determination block 601, which determines the relative location of the pixel in the block of information and which forwards to one of multiple filters. As previously described, a slice represents one or more MBs of the input video. If a pixel is located at the boundary of a 16×16 macroblock, the block effect is worse than at other places due to different prediction model and quantization at the macroblock level. If the pixel is located at an MB boundary, the pixel is provided to the input of a first USF filter, shown as USF 1 605, for filtering pixels at MB boundaries. If a pixel is located at the boundary of a sub-block, such as at the boundary of an 8×8 block or a 4×4 block or an 8×4 block or a 4×8 block, the block effect exists due to the block-based coding operation, such as DCT or the like. If the pixel is located at the boundary of a sub-block, the pixel is provided to the input of a second USF filter, shown as USF 2 607, for filtering pixels at sub-block boundaries. Otherwise, the pixel is located within a block or sub-block, and is provided to the input of a third USF filter, shown as USF 0 603, for filtering "internal" pixels or those not located along block or sub-block boundaries. The output of each of the USF filters 603, 605 and 607 are incorporated into the higher resolution output video.

Various embodiments are contemplated for each of the USF filters 603, 605 and 607. In the various embodiments described herein, each up sample filter, whether fixed or adaptive, performs interpolation and low pass filtering of the pixel values. In one embodiment, new pixels (e.g., zero-valued pixels) are inserted between existing pixel values as known to those skilled in the art and the result is low pass filtered to provide the higher resolution output. During the interpolating and filtering process, the original pixel values are adjusted and new values are calculated for the inserted pixels. The low pass filter portion of each up sample filter may be implemented according to any of several embodiments. In certain embodiments, each of the USF filters 603, 605 and 607 includes at least one predetermined and fixed filter. In one embodiment, the first filter USF 1 605 is configured as a relatively strong low pass filter (LPF), the second filter USF 2 607 is configured as a medium strength LPF, and the third filter USF 0 603 is configured as a relatively weak LPF (i.e., the filter strength of USF 1 605 is greater than the filter strength of USF 2 607, and the filter strength of USF 2 607 is greater than the filter strength of USF 0 603). The relative filter strength of each LPF indicates the level of filtering of higher frequency information. Thus, a stronger LPF filters (e.g., removes) a greater amount of the higher frequency information so that a reduced amount of the higher frequency information passes to the output of the filter. The relative strength of each LPF is controlled by the number of taps and/or the values of tap coefficients. In one embodiment, the filter USF 1 605 includes an 8-tap filter, the filter USF 2 607 includes a 6-tap filter, and the filter USF 0 603 includes a 4-tap filter. Of course, many variations are possible and contemplated. For example, in another embodiment, the filter USF 1 605 includes a 6-tap filter and the filters USF 2 607 and USF 0 603 each include a 4-tap filter, where the tap coefficients are selected to perform the relative strength of filtering.

In certain embodiments, the tap values of the low pass filters may be implemented using a window function. As known to those skilled in the art of filter design, filter window functions are relatively easy to implement and provide a suitable technique for the reduction of Gibb's oscillations. The window functions operate to smooth the signal so that the resulting spectrum is more band-limited thereby reducing spectral leakage. A number of different window functions may be used, such as, for example, the rectangular window, the triangular window (e.g., Bartlett), the raised-cosine or cosine-squared windows (e.g., Hann), the Hamming window, the Blackman window, the Kaiser-Bessel window, etc. A suitable window function is selected depending upon the relative amount of reduction in the amplitude of the Gibb's oscillations, the implementation complexity, and the actual application of the filter during image processing. In certain embodiments, a Kaiser-Bessel window function is used to derive the tap values of the filters 603, 605 and 607. In one Kaiser-Bessel window function embodiment, for example, the filter USF 1 605 is a 6-tap filter with tap coefficients [1, −5, 20, 20, −5, 1]/32 with a beta factor ($\beta$) of 3.1, the filter USF 2 607 is a 4-tap filter with tap coefficients [−3, 19, 19, −3]/32 with a $\beta$ factor of 2.75, and the filter USF 0 603 is a 4-tap filter with tap coefficients [0, 16, 16, 0]/32 with a $\beta$ factor of 10. Each filter may be configured in hardware or firmware or software, such as including a memory (such as a lookup table or the like) storing the filter taps.

In other embodiments, any one or more of the USF filters 603, 605 and 607 is configured as an adaptive or programmable filter. An adaptive filter may be implemented according to any one of various configurations. In certain embodiments, each adaptive filter is implemented with a memory, such as a lookup table or the like, which stores multiple filter sets or tap coefficient values selected based on one or more additional factors or information, such as boundary strength information or the like. Alternatively, each of the USF filters 603, 605 and 607 include programmable filters that are programmed or with tap values selected based on the additional information. As shown, for example, boundary strength information is provided to each of the USF filters 603, 605 and 607 for selecting from among multiple predetermined filters or for programming filter tap coefficients. As known to those skilled in the art, the luma portion of the video information is processed by a boundary strength circuit 609 of a deblocking filter (e.g., such as the deblocking filters 105 and/or 107) to calculate boundary strength information. In one embodiment, for example, the boundary strength circuit 609 calculates boundary strength information for each 4×4 sub-block (of each MB) in the horizontal and vertical directions, and may use other information, such as a quantization parameter or the like, to perform boundary strength calculations. For the adaptive filter embodiments, the boundary strength information is used to select from among multiple filters or to program filter tap coefficients in each of USF filters 603, 605 and 607.

Figure 7:
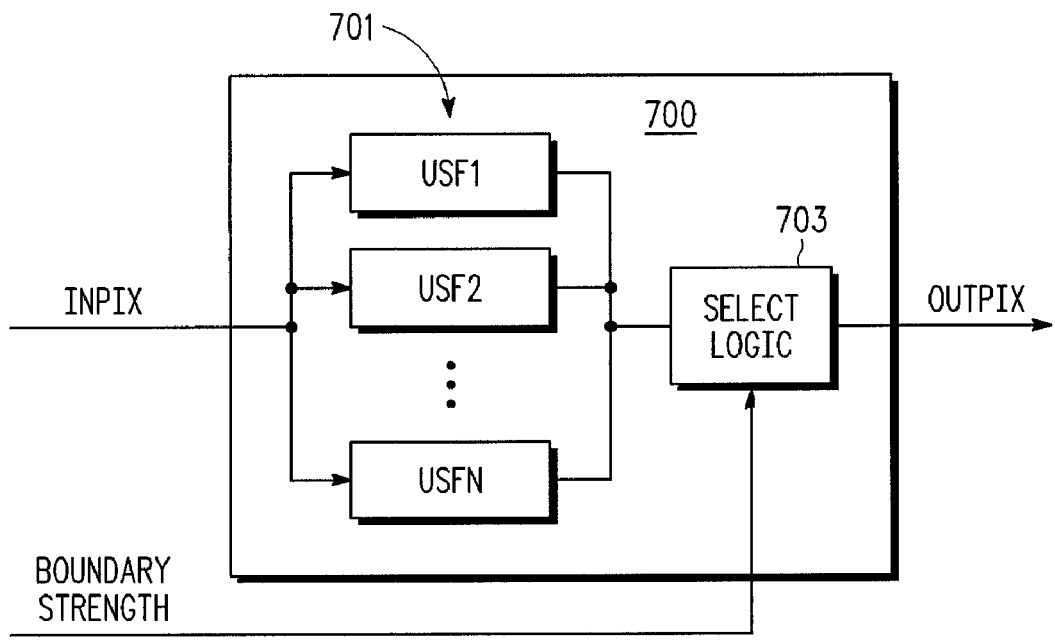
FIG. 7 is a simplified block diagram of an exemplary adaptive filter according to one adaptive filter embodiment which may be used to implement any one or more of the USF filters of FIG. 6 according to an adaptive filter configuration.

FIG. 7 is a simplified block diagram of an exemplary adaptive filter 700 according to one adaptive filter embodiment which may be used to implement any one or more of the USF filters 603, 605 and 607 according to an adaptive filter configuration. The input pixel values, shown as INPIX, are provided to respective inputs of a number "N" of up sample filters, shown as filters USF1, USF2, . . . , USFN. The output of the up sample filters 701 are provided to one input or corresponding inputs of select logic 703 having an adjust input receiving the boundary strength information. The select logic 703 selects an output of one of the up sample filters 701 and provides the selected output as the output pixel values, shown as OUTPIX. In this case, the up sample filters 701 are predetermined fixed filters, configured with a different filter strength. One of the bank of filters is selected based on additional information, such as boundary strength information. It is appreciated that FIG. 7 is representative of other embodiments for selecting from among multiple fixed filters, such as using the select logic 703 to enable a selected filter, to provide INPIX to a selected filter input, etc. Also, the up sample filters 701 may be stored in a lookup table or the like in which one of the filters is selected based on the boundary strength information.

Figure 8:
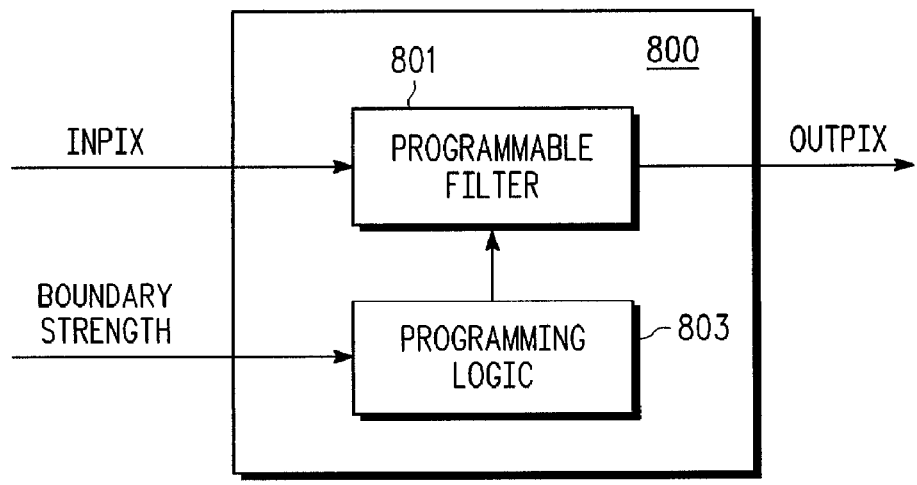
FIG. 8 is a simplified block diagram of an exemplary adaptive filter according to another adaptive filter embodiment which may be used to implement any one or more of the USF filters of FIG. 6 according to an adaptive filter configuration.

FIG. 8 is a simplified block diagram of an exemplary adaptive filter 800 according to another adaptive filter embodiment which may be used to implement any one or more of the USF filters 603, 605 and 607 according to an adaptive filter configuration. In this case, the input pixel values INPIX are provided to a programmable filter 801, which is programmed by programming logic 803 having an adjust input receiving the boundary strength information and which has an output providing OUTPIX. The programmable filter 801 may be implemented in any one of several manners, such as programmable filter tap coefficients and beta factor values, programmable number of filter taps and tap coefficients, etc. The programming logic 803 programs the programmable filter 801 with a filter strength based on additional information, such as the boundary strength information as illustrated.

Figure 9:
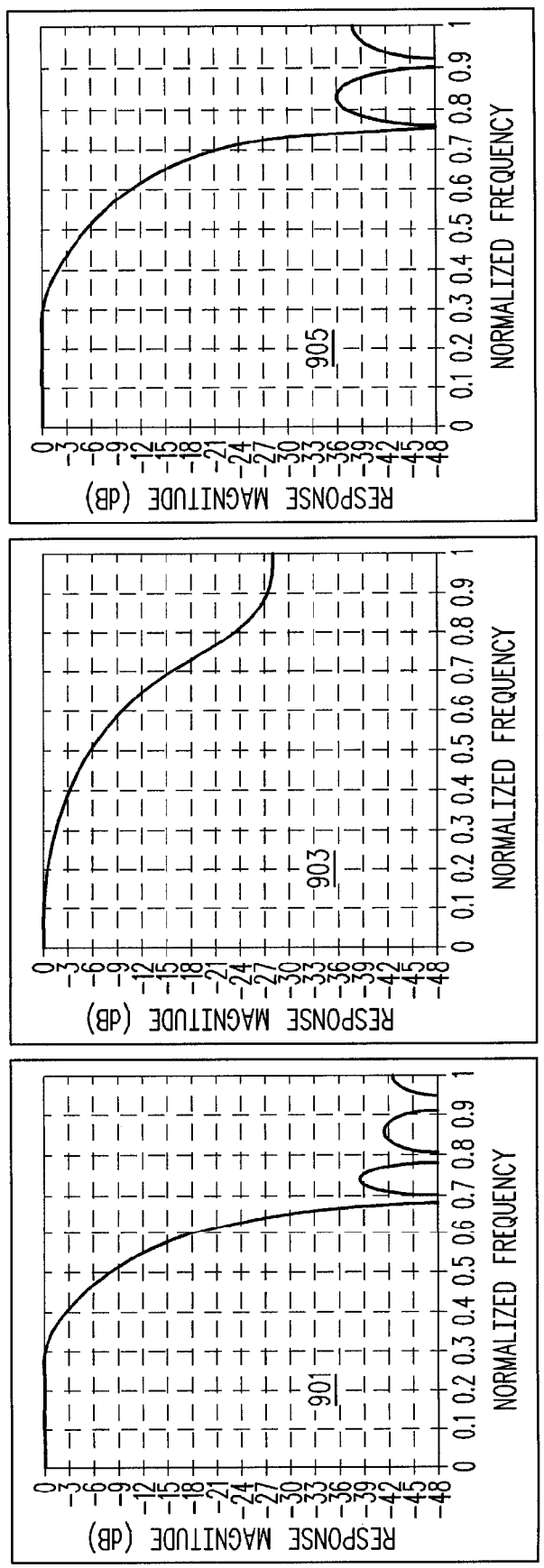
FIG. 9 is a diagram of three graphs depicting exemplary filter frequency responses for corresponding exemplary configurations of the respective USF filters of FIG. 6.

FIG. 9 is a diagram of three graphs 901, 903 and 905 depicting exemplary filter frequency responses for corresponding exemplary configurations of the USF filters 605, 603 and 607, respectively. Each graph plots response magnitude in decibels (dB) versus Normalized Frequency. The first graph 901 illustrates a stronger LPF function for the USF filter 605 for MB boundary pixels in which greater attenuation is achieved at the higher frequency levels. As shown, for example, the frequency response magnitude drops off relatively sharply and reaches −48 dB before the normalized frequency of 0.7. The second graph 903 illustrates a relatively weak LPF function for the USF filter 603 for internal block pixels in which reduced attenuation occurs at the higher frequency levels. As shown, for example, the response magnitude drops off much more slowly and does not drop below −30 dB at the normalized frequency of 1. The third graph 905 illustrates a medium-level LPF function for the USF filter 607 for pixels on the sub-block boundaries. As shown, for example, the response magnitude drops off to −48 dB between the normalized frequency levels 0.7 and 0.8. As illustrated in this specific and exemplary embodiment, the strongest filtering is applied to the pixels located at the MB boundaries, the weakest filtering is applied to the pixels located within the video sub-blocks and not located at any boundaries, and a medium amount of filtering is applied to the pixels located at the boundaries of the sub-blocks but not at the MB boundaries.

It is appreciated that various alternatives are possible and contemplated. For example, in one embodiment using only two filter variations, a strong filter is applied to pixels located at both MB and sub-block boundaries and a weaker filter is applied to the remaining inner pixels. In another embodiment, a strong filter is applied to the pixels at the MB boundaries while a weaker filter is applied to remaining pixels (including pixels at sub-block boundaries and inner pixels).

Figure 10:
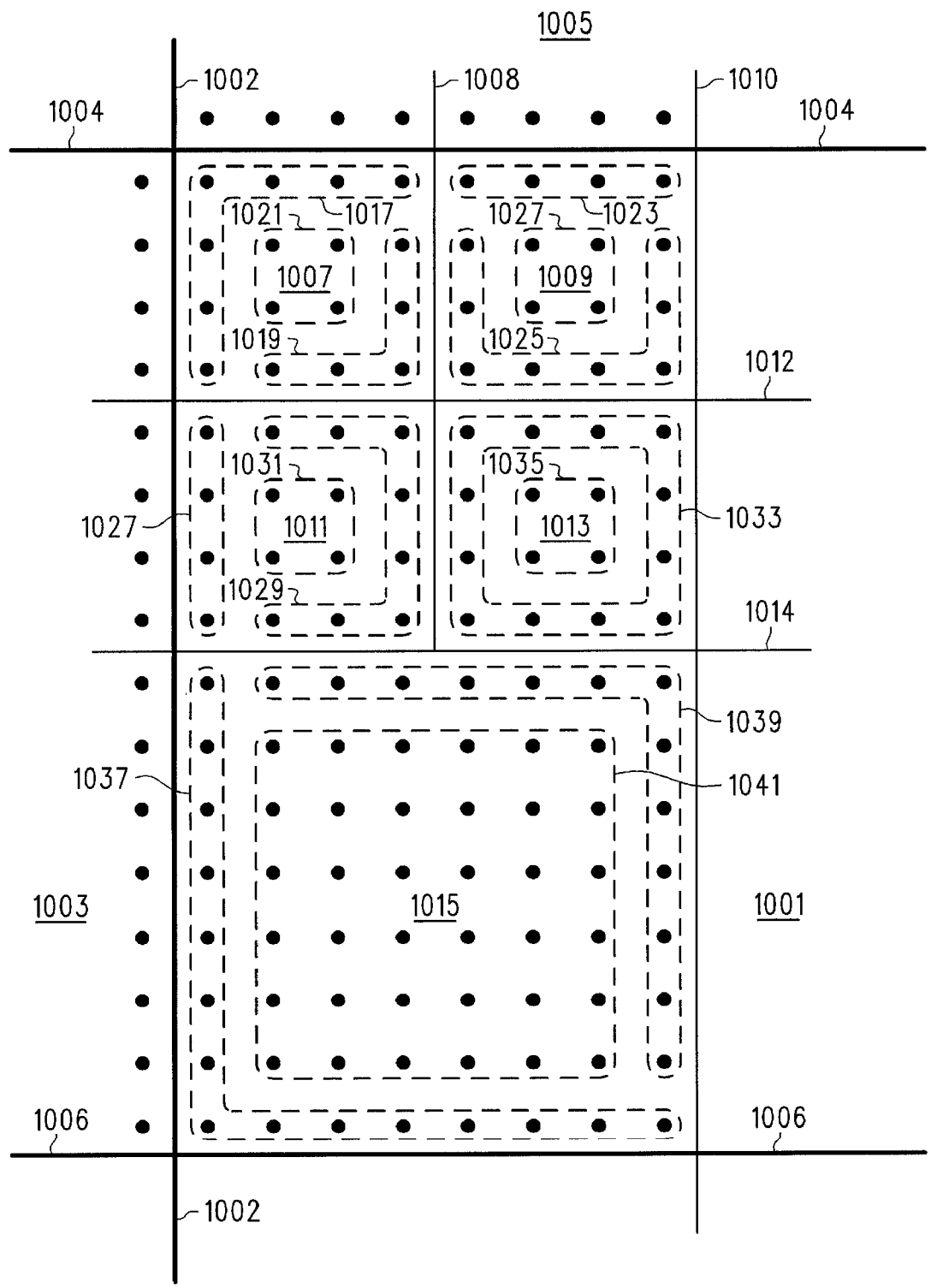
FIG. 10 is figurative diagram of certain pixels of a portion of a macroblock and the relative filtering selected as a function of pixel position.

FIG. 10 is figurative diagram of certain pixels of a portion of a macroblock 1001 and the relative filtering selected as a function of pixel position. The pixels are represented by rows and columns of solid dots "●". A vertical macroblock boundary line 1002 separates the macroblock 1001 from another macroblock 1003 located immediately to the left of the macroblock 1001. The macroblock 1001 is bounded by an upper horizontal macroblock boundary line 1004 and a lower horizontal macroblock boundary line 1006. The horizontal macroblock boundary line 1004 separates the macroblock 1001 from another macroblock 1005 located immediately above it. The upper-left corner of the macroblock 1001 includes four 4×4 sub-blocks 1007, 1009, 1011 and 1013. A vertical sub-block boundary 1008 separates the sub-block 1007 to its left from the sub-block 1009 to its right and further separates the sub-block 1011 to its left from the sub-block 1013 to its right. A horizontal sub-block boundary 1012 separates the sub-block 1007 above it from the sub-block 1011 below it and further separates the sub-block 1009 above it from the sub-block 1013 below it. The four 4×4 sub-blocks 1007, 1009, 1011 and 1013 are bounded by additional sub-block boundaries including a horizontal sub-block boundary 1010 (immediately to the right of the sub-blocks 1009 and 1013) and a horizontal sub-block boundary 1014 (immediately below the sub-blocks 1011 and 1013).

The first 4×4 sub-block 1007 is located in the upper-left corner of the macroblock 1001. The top-most and left-most 7 pixels of the 4×4 sub-block 1007 located along the macroblock boundaries 1004 and 1002 form a group 1017 of 7 pixels within the 4×4 sub-block 1007 that are located along a macroblock boundary. Each group of pixels defined herein is shown bounded by a dashed line. The 5 lower-right and lower-left pixels located along the right-side boundary and located along the bottom of the 4×4 sub-block 1007 (excluding the upper-right and lower-left pixels) form a group 1019 of 5 pixels within the 4×4 sub-block 1007 that are located along a sub-block boundary but not along a macroblock boundary. The remaining 4 internal pixels form a group 1021 within the 4×4 sub-block 1007 that are not located at a macroblock or sub-block boundary. In a similar manner, the next 4×4 sub-block 1009 located immediately to the right of the 4×4 sub-block 1007 includes a group 1023 of 4 pixels adjacent the macroblock boundary 1004, a group 1025 of 8 pixels at a sub-block boundary (1008, 1012 or 1010) and a group 1027 of 4 internal pixels. In a similar manner, the next 4×4 sub-block 1011 located immediately below the 4×4 sub-block 1007 includes a group 1027 of 4 pixels at the macroblock boundary 1002, a group 1029 of 8 pixels at sub-block boundaries 1012, 1008 or 1014, and a group 1031 of 4 internal pixels. In a similar manner, the next 4×4 sub-block 1013 located immediately to the right of the 4×4 sub-block 1011 includes a group 1033 of 12 pixels at sub-block boundaries 1008, 1010, 1012 or 1014, and a group 1035 of 4 internal pixels.

The macroblock 1001 also includes an 8×8 sub-block 1015 located immediately below the sub-block boundary 1014 and above the macroblock boundary 1006 (and bounded at the right by macroblock boundary 1012 and at the left by sub-block boundary 1010). The left-most and bottom-most 15 pixels of the 8×8 sub-block 1015 are located along macroblock boundaries 1002 and 1006, respectively, and thus form a group 1037 of 15 pixels at a macroblock boundary. The remaining 13 pixels at the periphery of the 8×8 sub-block 1015 form a group 1039 of pixels located at a sub-block boundary (1010 or 1014). The remaining 36 internal pixels of the 8×8 sub-block 1015 form a group 1041 of internal pixels. Although not shown, similar treatment is made of the pixels within 4×8 and 8×4 sub-blocks.

When the pixels of the macroblock 1001 are provided as the lower resolution input video of the up sample filter system 600, each of the pixels of the groups 1017, 1023, 1027, and 1037 are provided to the USF 1 605 for relatively strong filtering. The pixels of the groups 1019, 1025, 1029, 1033, and 1039 are provided to the USF 2 607 for medium strength filtering. The pixels of the remaining internal groups 1021, 1027, 1031, 1035, and 1041 are provided to the USF 0 603 for relatively weak filtering.

A method of processing block-based image information according to one embodiment including up sample filtering pixels located along boundaries of image blocks using a first filter strength and up sample filtering at least a portion of the pixels that are not located along boundaries of the image blocks using a second filter strength. The first filter strength may be greater than the second filter strength to provide increased filtering at the boundaries of the image blocks. The up sample filtering may include interpolating and low pass filtering. The method may include decoding video information to provide the image blocks prior to up sample filtering.

The method may further include determining boundary strength information and adapting at least one of the first and second filter strengths based on the boundary strength information. In one embodiment, the adapting may include selecting from among multiple predetermined filters. The multiple filters may be configured as separate filter circuits or in software as a set of filter tap coefficients stored in memory, such as a lookup table or the like. In another embodiment, the adapting may include programming filter tap coefficients.

The image blocks may be further divided into sub-blocks. In this case, the method may include up sample filtering pixels located along boundaries of the sub-blocks using the second filter strength, and up sample filtering pixels other than those located along boundaries of the image blocks and the sub-blocks using a third filter strength. In one embodiment, the first filter strength is greater than the second filter strength and the second filter strength is greater than the third filter strength.

A method of processing block-based image information according to another embodiment includes up sample filtering pixels located along boundaries of the image blocks and the sub-blocks using a first filter strength and up sample filtering pixels other than those located along boundaries of the image blocks and the sub-blocks using a second filter strength.

An up sample filter system for processing block-based image information according to another embodiment includes a first up sample filter which filters pixels located along boundaries of the image blocks using a first filter strength, and a second up sample filter which filters at least a portion of the pixels that are not located along boundaries of the image blocks using a second filter strength. The first filter strength may be greater than the second filter strength. Each of the up sample filters may be implemented as an interpolating low pass filter.

The up sample filter system may include a boundary strength circuit having an input for receiving the block-based image information and an output providing boundary strength information. In this case, each of the up sample filters has an adjust input receiving the boundary strength information for adapting the first and second filter strengths, respectively. In one embodiment, each of the first and second up sample filters includes a set of predetermined filters in one of the filters is selected based on the boundary strength information. In another embodiment, each of the first and second up sample filters includes programmable filter taps that are programmed based on the boundary strength information.

The second up sample filter may filtering pixels located along boundaries of sub-blocks of the image blocks using the second filter strength, and a third up sample filter using a third filter strength may be provided to filters pixels other than those located along boundaries of the image blocks and the sub-blocks. In one embodiment, the first filter strength is greater than the second filter strength and the second filter strength is greater than the third filter strength. In another embodiment, the first up sample filter is a low pass filter with 8 filter taps, the second up sample filter is a low pass filter with 6 filter taps, and the third up sample filter is a low pass filter with 4 filter taps. In another embodiment, the up sample filters are low pass filters implemented according to a Kaiser-Bessel window function. In a more specific embodiment, the first up sample filter is a low pass filter with filter tap coefficients [1, −5, 20, 20, −5, 1]/32 and a beta factor of 3.1, the second up sample filter is a low pass filter with filter tap coefficients [−3, 19, 19, −3]/32 and a beta factor of 2.75, and the third up sample filter is a low pass filter with filter tap coefficients [0, 16, 16, 0]/32 and a beta factor of 10.

Although the present invention has been described in considerable detail with reference to certain preferred versions thereof, other versions and variations are possible and contemplated. For example, circuits or logic blocks described herein may be implemented as discrete circuitry or integrated circuitry or software or any alternative configurations. Specific filter design configurations, including filter values and tap coefficients, do not need to be exact values and may slightly vary without significantly reducing filtering improvements. Also different filter types may be employed other than those specifically described. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A method of processing block-based image information, the block-base image information comprising a plurality of image blocks in which each image block comprises a plurality of pixels and in which each of the plurality of image blocks comprises a plurality of sub-blocks, said method comprising:

up sample filtering pixels located along boundaries of the plurality of image blocks using a a Kaiser-Bessel window function low pass filter with filter tap coefficients [1, −5, 20, 20, −5, 1]/32 and a beta factor of 3.1;

up sample filtering pixels located along boundaries of the plurality of sub-blocks using a Kaiser-Bessel window function low pass filter with filter tap coefficients [−3, 19, 19, −3]/32 and a beta factor of 2.75; and up sample filtering pixels other than those located along boundaries of the image blocks and the sub-blocks using a Kaiser-Bessel window function low pass filter with filter tap coefficients [0, 16, 16, 0]/32 and a beta factor of 10.

2. The method of claim 1, further comprising, prior to said up sample filtering, decoding video information to provide the plurality of image blocks.

3. The method of claim 1, further comprising:
determining boundary strength information; and
adapting at least one of the first, second and third filter strengths based on the boundary strength information.

4. The method of claim 3, wherein said adapting comprises selecting from among a plurality of predetermined filters.

5. The method of claim 3, wherein said adapting comprises programming a plurality of filter tap coefficients.

6. An up sample filter system for processing block-based image information, the block-based image information comprising a plurality of image blocks in which each image block comprises a plurality of pixels and in which each of the plurality of image blocks comprises a plurality of sub-blocks, comprising:

a first up sample filter which filters pixels located along boundaries of the plurality of image blocks using a first filter strength, wherein said first up sample filter comprises a Kaiser-Bessel window function low pass filter with filter tap coefficients [1, −5, 20, 20, −5, 1]/32 and a beta factor of 3.1;

a second up sample filter which filters pixels located along boundaries of the sub-blocks using a second filter strength, wherein said second up sample filter comprises a Kaiser-Bessel window function low pass filter with filter tap coefficients [−3, 19, 19, −3]/32 and a beta factor of 2.75; and a third up sample filter which filters pixels other than those located along boundaries of the image blocks and the sub-blocks using a third filter strength, wherein said third up sample filter comprises a Kaiser-Bessel window function low pass filter with filter tap coefficients [0, 16, 16, 0]/32 and a beta factor of 10.

7. The up sample filter system of claim 6, further comprising:
a boundary strength circuit having an input for receiving the block-based image information and an output providing boundary strength information; and
wherein said first, second and third up sample filters each have an adjust input receiving said boundary strength information for adapting said first, second and third filter strengths, respectively.

8. The up sample filter system of claim 7, wherein each of said first, second and third up sample filters comprises a plurality of predetermined filters in which one of said plurality of predetermined filters is selected based on said boundary strength information.

9. The up sample filter system of claim 7, wherein each of said first, second and third up sample filters comprises programmable filter taps that are programmed based on said boundary strength information.

* * * * *